United States Patent
Goren et al.

(10) Patent No.: US 7,436,858 B2
(45) Date of Patent: Oct. 14, 2008

(54) METHODS AND SYSTEMS FOR ADAPTIVE RATE MANAGEMENT, FOR ADAPTIVE POINTER MANAGEMENT, AND FOR FREQUENCY LOCKED ADAPTIVE POINTER MANAGEMENT

(75) Inventors: Motti Goren, Rehovot (IL); Ron Cohen, Nes Ziona (IL); Dov Wulich, Metar (IL)

(73) Assignee: Lycium Networks (B.V.I.) Ltd., Modiln (IL)

( * ) Notice: Subject to any disclaimer, the term of this patent is extended or adjusted under 35 U.S.C. 154(b) by 918 days.

(21) Appl. No.: 10/856,788

(22) Filed: Jun. 1, 2004

(65) Prior Publication Data

US 2004/0240478 A1 Dec. 2, 2004

Related U.S. Application Data

(60) Provisional application No. 60/473,880, filed on May 29, 2003.

(51) Int. Cl.
*H04L 12/43* (2006.01)
(52) U.S. Cl. .................................................. 370/503
(58) Field of Classification Search ........................ None
See application file for complete search history.

(56) References Cited

U.S. PATENT DOCUMENTS 5,311,511 A * 5/1994 Reilly et al. ................. 370/516

OTHER PUBLICATIONS

Malis et al, draft-malis-pwe3-sonet-00—Sonet/SDH Circuit Emulation over Packet (CEP), 33 pages, Sep. 2001.*
Sari et al, Jitter Reduction In SDH Networks, IEEE, 5 pages, 1991.*

* cited by examiner

*Primary Examiner*—Frank Duong
(74) *Attorney, Agent, or Firm*—Mark M. Friedman (57) ABSTRACT

An adaptive rate management method and system for adapting a receiver rate to a transmission rate in a packet switch network comprises determining an error value at a sample rate, obtaining an updated accumulator value based on said error value $E_s$ at a decimated sample rate, and generating an appropriate rate command and changing said accumulator value at the decimated rate based on the updated accumulator value. The method may be adapted for either adapter point management or bit stuffing. When applied to adapter point management (APM), the method generates pointer adjustments for rate management. In a frequency locked APM preferred embodiment of the method and system, pointer adjustments in an interval are generated at a constant rate based on an average pointer adjustment value calculated in previous intervals.

13 Claims, 10 Drawing Sheets

METHODS AND SYSTEMS FOR ADAPTIVE RATE MANAGEMENT, FOR ADAPTIVE POINTER MANAGEMENT, AND FOR FREQUENCY LOCKED ADAPTIVE POINTER MANAGEMENT

This application claims priority from U.S. Provisional Application No. 60/473,880 filed May 29, 2003.

FIELD AND BACKGROUND OF THE INVENTION

The present invention relates generally to the field of telecommunications, and in particular to adaptive pointer management for circuit emulation service.

Circuit emulation is a service by which synchronous circuits are carried across an asynchronous Packet Switch Network (PSN). The circuit emulation service over Asynchronous Transfer Mode (ATM) networks has been standardized and implemented. Circuit emulation over a regular packet network running over the Internet Protocol, or over Ethernet media or similar networks, is becoming more important, as PSNs are becoming predominant.

Circuit emulation has two distinct components; the adaptation of the circuit data into a packet stream at the sender, and the conversion of the circuit emulation stream back into a synchronous circuit at the receiver. The circuit emulation receiver logic requires a buffering mechanism to account for delay variation in the packet stream carrying the emulated circuit. This buffering mechanism is generically referred to as a "jitter buffer". The sender sends the packet stream at a rate dictated by a sender clock. In many cases, the receiver does not have the sender clock available.

The receiver has control over the speed with which it empties the jitter buffer, by either controlling the outgoing circuit clock on its side, or by other means. If the receiver clock is faster than the sender clock, the jitter buffer will slowly become empty, as it is being filled slower than it is being emptied. Once the buffer empties, the receiver will no longer have circuit data, and errors will occur. Therefore, there is a need to have a way to reconstruct the sender clock on the receiver side. The common practice is to monitor the fill level of the jitter buffer (explained below), and adapt the frequency of a controlled oscillator accordingly. This task is challenging, as there are strict restrictions within the standards on the quality and characteristics of a circuit clock. Since the delay variations of packet arrival across the PSN can be much larger than the ATM cell delay variations, the challenge of adaptive clock recovery across a PSN is larger.

The synchronous optical network (SONET) standard is a standard for optical telecommunications transport prepared by the American National Standards Institute (ANSI). Similarly, the synchronous digital hierarchy (SDH) standard is the international standard prepared by the International Telecommunication Union (ITU). Below we refer only to SONET technology, with the understanding that the present invention is applicable to SDH technology as well.

One of the benefits of SONET is that it can carry large payloads (above 50 Mbps) in synchronous transport signals (STS-N), as well as accommodating the lower rate plesiochronous digital hierarchy (PDH) signals, including T1, T3, E1, E3 etc. To achieve this capability, the basic SONET synchronous transport signal (STS-1) can be sub-divided into smaller components or structures, known as Virtual Tributaries (VTs), for the purpose of transporting and switching PDH payloads.

SONET utilizes payload pointers to carry the signal. A payload pointer gives the location of the beginning of the payload within the SONET structure. Differences in phase and frequency between two SONET NEs (Network Elements) can be handled by the use of payload pointers. If the sending SONET NE is faster than the receiving NE, the receiving NE will introduce a negative pointer adjustment (PA) and shift the payload ahead by one byte or 8 bits (N bytes for STS-Nc). This allows the receiving NE to keep up with the sending NE without loss of information. Similarly, if the sending NE is slower than the receiving NE, the receiving NE will introduce a positive pointer adjustment of one byte (N bytes for STS-Nc).

SONET emulation technology has a variant of adaptive clock recovery called Adaptive Pointer Management (APM). APM does not directly change the clock at the receiver side to accommodate for differences between sender and receiver clocks, but rather generates pointer adjustments that change effectively the rate at which the receiver reads the information from the jitter buffer, and plays it out on the circuit data. Using conventional SONET methods, PAs are converted to clock differences by devices called "Mappers". This is further explained in FIG. 1.

Figure 1:
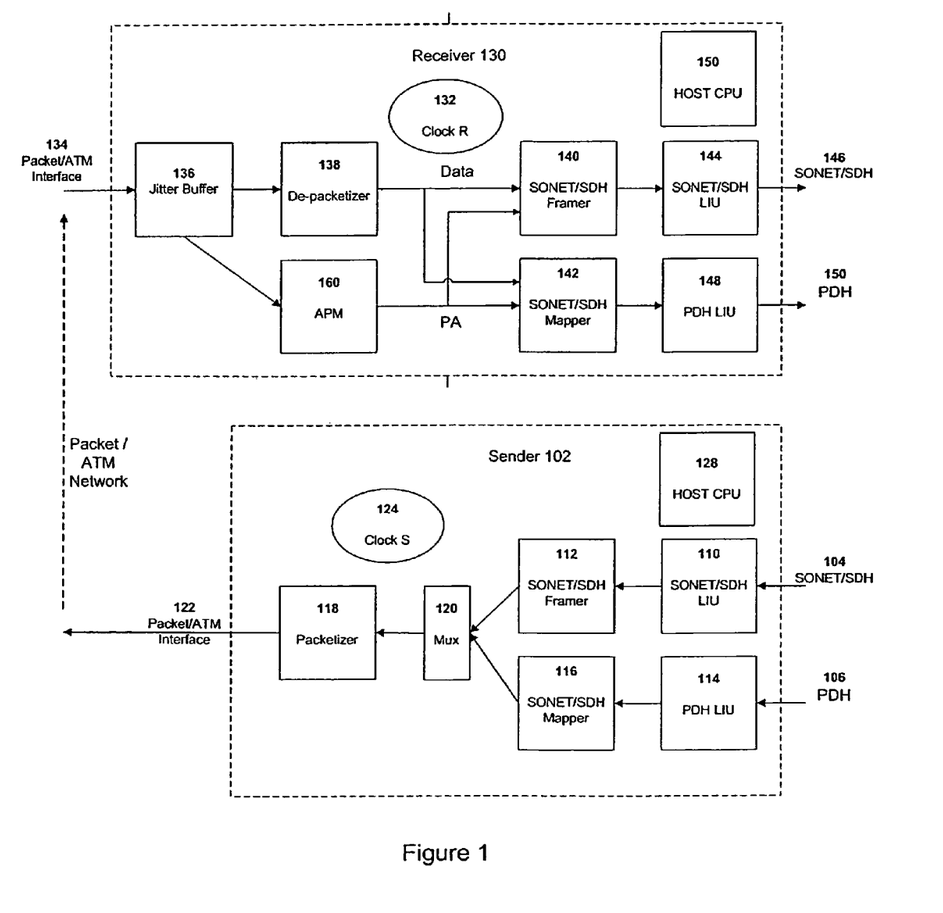
FIG. 1 describes a simplified circuit emulation system with APM.

FIG. 1 describes a simplified SONET emulation system 100 with APM. System 100 comprises a sender 102 connected across a packet switch network or an ATM network to a receiver 130. Sender 102 includes either a SONET interface 104, a PDH interface 106, or both. Sender 102 further includes a SONET line interface unit (LWU) 110, a SONET framer 112, a PDH LIU 114 and a PDH mapper 116 and a Host CPU 128. Host CPU 128 runs the various software tasks of sender 102, including configuration and performance monitoring tasks. Mapper 116 is responsible for mapping the PDH signals into SONET channels. Sender 102 further includes a packetizer 118 that extracts the SONET information from either SONET framer 112 or mapper 116 or both, through a multiplexer (MUX) 120. The sender encapsulates the different SONET channels into packet streams, and sends the packets through an output sender interface 122 across the PSN or ATM network. Each packet carries a sequence number to allow the receiver to assemble the incoming stream in the order it has been sent, and to identify lost packets. The sender is driven by a system clock 124 denoted Clock-S. Receiver 130, which includes and is driven by a Clock-R 132 that is not synchronized to the sender clock, and which may therefore operate at a different frequency, receives the packets from the sender through an input receiver interface 134. Arriving packets are read from the packet interface and placed in a jitter buffer 136. The sequence number of incoming packets is used to identify lost, duplicated, or mis-ordered packets. Packets are placed in the jitter buffer in the order they were sent. If one or more packets are lost, the jitter buffer indicates the loss. For example, if packets with sequence numbers 54, 55, 55, 52, 53, 56, 58, 59, 60, arrive at the receiver, the receiver would re-order these packets to the correct order 52 to 60, ignoring the duplicated $55^{th}$ packet, and indicating that packet 57 was lost. Separate jitter buffers are maintained for each emulated channel. A de-packetizer 138 in the receiver extracts information from the jitter buffer, and plays it out onto either a SONET framer 140 or a mapper 142 (both included in the receiver), at a rate determined by Clock-R. Framer 140 sends the SONET signal through a SONET LIU 144 to a SONET interface 146, which exits the receiver. The mapper extracts the PDH information from the SONET containers, and sends it through a PDH LIU 148 to a PDH interface 150, which also exits the receiver. An APM module 160 monitors the fill level of the jitter buffer for each channel, and generates positive or negative PAs to maintain the differences in Clock-R and Clock-S. The PAs are played out to the framer interface or to the mapper interface. The standard SONET framer and mapper interfaces support PA indications. PAs are included in the SONET signal sent on the SONET interface. PAs are converted into change of clock for each PDH channel in the standard mapper block. Host CPU 150 runs the software tasks of receiver 130.

The SONET pointer adjustments mechanism is but one technique to accommodate for differences in NE clocks. Another widely used technique is called bit-stuffing, which multiplexes low rate PDH signals into higher rate trunks. Examples of bit-stuffing include multiplexing T1 into a T3 trunk, mapping T1 into SONET, and mapping T3 into SONET. The bit-stuffing technique encapsulates the lower rate signal into a higher rate container. The higher rate container includes opportunity bits and opportunity control bits. The opportunity control bits indicate whether the opportunity bits carry data or whether they should be ignored. Consequently, the NE mapping the lower rate PDH service into a higher rate multiplex uses more opportunity bits if the rate of the incoming lower rate signal is driven by a clock faster than the NE clock, and uses less opportunity bits if the lower rate signal is driven by a slower clock.

The existing techniques for adjusting differences in NE clocks are therefore dedicated in the sense that they are quite inflexible. Different applications require different systems. In existing APM, the pointer adjustment is not optimized, There is therefore a need for flexible and optimized methods and systems that can be applied to a variety of application where NE clock adjustment is required.

SUMMARY OF THE INVENTION

The present invention discloses methods and systems for adaptive rate management, for adaptive pointer management, and for frequency locked adaptive pointer management. The methods and systems disclosed herein are superior to existing NE clock adjustment methods as systems, e.g. APM and bit stuffing, in that they provide greater flexibility and more accurate corrective actions.

According to the present invention there is provided an adaptive pointer management method for accommodating clock frequency differences between a sender having a sender clock and a receiver having a receiver clock, the method comprising the steps of determining an error value $E_i$ at a sample rate; decimating the sample rate by a value $N_{samp}$; determining a decimated error value E as a function of the last $N_{samp}$ number of error values $E_i$; at the decimated rate, obtaining an updated accumulator value based on the decimated error value E; and at the decimated rate, based on the updated accumulator value, generating an appropriate pointer adjustment command and changing the accumulator value, whereby the pointer adjustment command ensures synchronization between the transmitter and receiver rates.

According to a feature in the adaptive pointer management method of the present invention, the receiver and sender are connected over a packet switched network.

According to another feature in the adaptive pointer management method of the present invention, the step of determining an error value $E_i$ includes monitoring a jitter buffer fill level $J_i$, each i-th interval having a length I determined by the receiver clock.

According to yet another feature in the adaptive pointer management method of the present invention, the step of computing $E_i$ includes determining, each i-th interval, an operating point $O_i$, and subtracting $O_i$ from $J_i$.

According to yet another feature in the adaptive pointer management method of the present invention, the step of determining the decimated error value E includes using a function selected from the group consisting of taking the maximum value of the last $N_{samp}$ number of error values $E_i$, averaging $E_i$, or taking the last value of $E_i$.

According to yet another feature in the adaptive pointer management method of the present invention, the step of obtaining an updated accumulator value includes multiplying the decimated error value E by a gain G to obtain an E*G product, and adding the E*G product to a previous accumulator value.

According to yet another feature in the adaptive pointer management method of the present invention, the step of generating an appropriate pointer adjustment command further includes, if the accumulator value is $\leq -1$, generating a positive pointer adjustment command and incrementing the accumulator value by +1, if the accumulator value $\geq +1$, generating a negative pointer adjustment command and decrementing the accumulator value by −1, and if the accumulator value is greater than −1 and smaller than +1, do nothing.

According to the present invention there is provided an adaptive rate management method for adapting a receiver rate to a transmission rate, the method comprising determining an error value $E_i$ at a sample rate; decimating the sample rate by a value $N_{samp}$; determining a decimated error value E as a function of the last $N_{samp}$ error values $E_i$; at the decimated rate, obtaining an updated accumulator value based on the decimated error value E; and at the decimated rate, based on the updated accumulator value, generating an appropriate rate adjustment command and changing the accumulator value, whereby the rate adjustment command ensures synchronization between the transmitter and receiver rates.

According to a feature in the adaptive rate management method of the present invention, $E_i$ is determined by monitoring a jitter buffer fill level $J_i$, each i-th interval having a length I determined by the receiver clock.

According to another feature in the adaptive rate management method of the present invention, the step of computing $E_i$ includes determining, each i-th interval, an operating point $O_i$, and subtracting $O_i$ from $J_i$.

According to yet another feature in the adaptive rate management method of the present invention, the decimated error value is obtained using a function selected from the group consisting of taking the maximum value of the last $N_{samp}$ number of error values $E_i$, averaging $E_i$, or taking the last value of $E_i$.

According to yet another feature in the adaptive rate management method of the present invention, the step of obtaining an updated accumulator value includes multiplying the decimated error value E by a gain G to obtain an E*G product, and adding the E*G product to a previous accumulator value.

According to yet anotheryet feature in the adaptive rate management method of the present invention, the step of generating an appropriate rate adjustment command further includes, if the accumulator value is $\leq -1$, generating a 'slow' rate command and incrementing the accumulator value by +1, if the accumulator value is $\geq +1$, generating a 'fast' rate command and decrementing the accumulator value by −1, and if the accumulator value is greater than −1 and smaller than +1, generating a 'none' rate command.

According to the present invention there is provided a frequency locked adaptive pointer management method comprising the steps of obtaining a plurality of pointer adjustments generated in an interval i by an adaptive pointer management technique; based on the plurality of pointer adjustments, calculating a long term average value $PA_{avg}(i+$ 1) of pointer adjustments to be generated in an immediately following interval i+1; and, in the interval i+1, generating appropriate pointer adjustments at a constant rate based on $PA_{avg}(i+1)$.

According to a feature in the frequency locked adaptive pointer management method of the present invention, the step of obtaining a plurality of pointer adjustments includes counting the number of positive pointer adjustments $PA^+(i)$ and negative pointer adjustments $PA^-(i)$ generated in interval i, and the step of calculating $PA_{avg}(i+1)$ includes calculating an average pointer adjustment value $PA_{avg}(i)$ of positive and negative pointer adjustments, and using $PA_{avg}(i)$ to calculate $PA_{avg}(i+1)$.

According to another feature in the frequency locked adaptive pointer management method of the present invention, the step of calculating a long term average value $PA_{avg}(i+1)$ includes obtaining a gain factor G, and calculating $PA_{avg}(i+1)$ according to the formula $PA_{avg}(i+1)=(1-G)*PA_{avg}(i)+G*(PA^+(i)-PA^-(i))$.

According to yet another feature in the frequency locked adaptive pointer management method of the present invention, the step of generating appropriate pointer adjustments at a constant rate includes generating a number of $PA_{avg}(i)$ positive pointer adjustments if $PA_{avg}(i)$ is greater than zero, and generating a number of $PA_{avg}(i)$ of negative pointer adjustments if $PA_{avg}(i)$ is smaller than zero.

According to the present invention there is provided a frequency locked adaptive rate management method comprising the steps of obtaining a plurality of rate commands generated in an interval i by an adaptive rate management technique; based on the plurality of rate commands, calculating a long term average value $PA_{avg}(i+1)$ of rate commands to be generated in an immediately following interval i+1; and, in the interval i+1, generating appropriate rate commands at a constant rate based on $PA_{avg}(i+1)$.

According to a feature in the frequency locked adaptive rate management method of the present invention, the step of obtaining a plurality of rate commands includes counting the number of 'slow' rate commands $PA^+(i)$ and 'fast' negative rate commands $PA^-(i)$ generated in interval i, and the step of calculating $PA_{avg}(i+1)$ includes calculating an average pointer adjustment value $PA_{avg}(i)$ of the 'slow' and 'fast' rate commands, and using $PA_{avg}(i)$ to calculate $PA_{avg}(i+1)$.

According to another feature in the frequency locked adaptive rate management method of the present invention, the step of calculating a long term average value $PA_{avg}(i+1)$ includes obtaining a gain factor G, and calculating $PA_{avg}(i+1)$ according to the formula $PA_{avg}(i+1)=(1-G)*PA_{avg}(i)+G*(PA^+(i)-PA^-(i))$.

According to yet another feature in the frequency locked adaptive rate management method of the present invention, the step of generating appropriate rate commands at a constant rate includes generating a number of $PA_{avg}(i)$ 'slow' rate commands if $PA_{avg}(i)$ is greater than zero, and generating a number of $PA_{avg}(i)$ 'fast' rate commands if $PA_{avg}(i)$ is smaller than zero.

According to the present invention there is provided a system for synchronizing a receiver clock and a sender clock, one each at two terminal ends of a transmission network, the system comprising sampling means to periodically sample, of each channel of the transmission network, an input jitter buffer fill level and to generate an error factor E for the channel; configuration means to generate configuration parameters that include a gain factor G, a rate decimation factor $N_{samp}$ and an operating point O; and pointer adjustment generator means for generating negative and positive pointer adjustments using the gain factor and the error factor, the pointer adjustments providing the required synchronization of the clocks.

According to a feature in the system for synchronizing a receiver clock and a sender clock of the present invention, the sampling means include a sampler operative to receive $N_{samp}$ configuration parameters from the configuration means, a sampling rate generator for periodically activating the sampler, and a detector for performing the sampling in response to triggers received from the sampler and the sampling generator, the sampling used to obtain periodic errors, the periodic errors used and for the generating of the error factor; and the pointer adjustment generator means include a multiplier for multiplying the error factor and the gain factor to obtain a G*E product, an accumulator for providing an updated accumulator value based on the gain*error product, and a comparator for comparing the updated accumulator value with a threshold, and for performing the generation of pointer adjustments based on the comparison.

According to another feature in the system for synchronizing a receiver clock and a sender clock of the present invention, the system further comprises, for each channel, pointer adjustment counters communicating with the pointer adjustment generator means.

According to the present invention there is provided a system for providing efficient pointer adjustments that synchronize a slave clock to a master clock located at two different terminal ends of a transmission network, the system comprising adaptive pointer management means for providing, per interval i, a first plurality of negative pointer adjustments and a second plurality of positive pointer adjustments, averaging means for producing a long term average of pointer adjustments per interval I using the pluralities of pointer adjustments, and pointer adjustment generating means for generating pointer adjustments at a constant rate each interval i, based on the long term average.

According to the present invention there is provided a system for synchronizing the rates of a transmitter and a receiver, one each at two terminal ends of a transmission network, the system comprising sampling means to periodically sample, in each channel of the transmission network, an input jitter buffer fill level and to generate an error factor for the channel, configuration means to generate configuration parameters that include a gain factor, and rate adjustment means for generating commands based on the error factor and the gain factor, the commands providing the required rate synchronization.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention discloses methods and systems for adaptive rate management, for adaptive pointer management, and for frequency locked adaptive pointer management. These methods and systems can be used for both adaptive pointer adjustment and for bit-stuffing, where the output of an APM method and apparatus according to the present invention can replace 'generate positive/negative pointer adjustment' by 'generate positive/negative bit stuffing' and can directly control the justification bits. Therefore, the methods and systems disclosed herein can be used in variety of systems and applications. The invention is described first using the concrete example of APM, and later generalized to cover all possible applications. The common generalized method is called Adaptive Rate Management (ARM).

Figure 2:
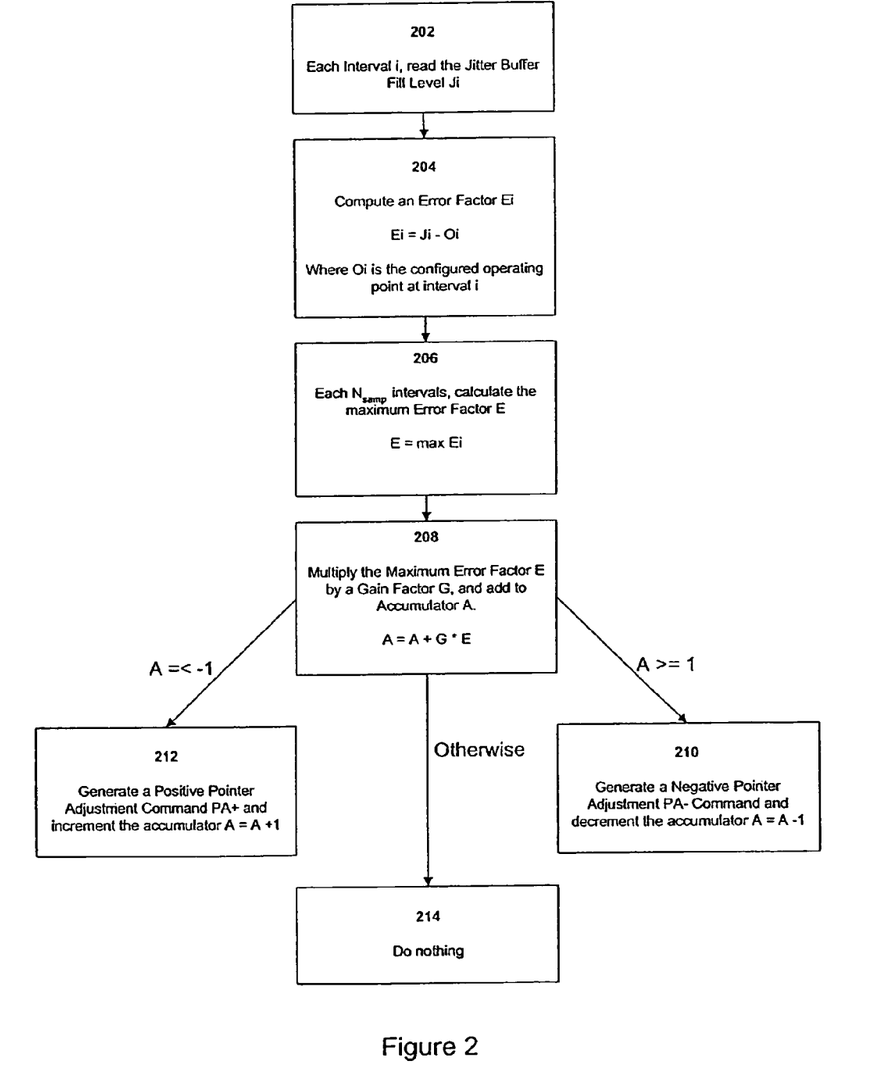
FIG. 2 describes in a block diagram the main steps of a preferred embodiment of an APM method of the present invention.

FIG. 2 describes in a block diagram the main steps of a preferred embodiment of an APM method according to the present invention. In a system comprising a sender and a receiver and described in more detail in FIG. 3, the receiver monitors the jitter buffer fill level $J_i$ each i-th interval "I" in a step 202. The jitter buffer fill level J is measured in bytes. The jitter buffer fill level is calculated by examining the first and last packets received, and the number of bytes played out from the first packet, as explained in detail below. The jitter buffer fill level is equal to the number of circuit emulation data received and is ready to be played out. The calculation does not depend on (is insensitive to) "lost" packets, i.e. to packets with a sequence number between the first and the last packet received that did not arrive at the receiver. For example, assume that 100 bytes of circuit emulation data is sent within each packet. Assume that the jitter buffer is holding packets with sequence numbers 55, 56, 58, 59 and 60, and that circuit emulation data is being read from packet 55 and played out towards the SONET interface. Assume that 50 bytes have already been read and played out from packet with sequence number 55. The jitter buffer fill-level then equals 550, 100 data bytes multiplied by 6 packets representing packets 55 to 60, minus the 50 bytes read. The fact that packet 57 has not arrived or has been dropped does not change the calculation.

The interval "I" is determined by the receiver clock, and is proportional to the expected interval time between packets. A typical value for I is 125 microseconds. In a step 204, an error factor $E_i = J_i - O_i$ related to the i-th interval I is computed by taking the differences between the current jitter buffer fill level J monitored in step 202, and the configured operating point $O_i$. The operating point represents the ideal jitter buffer fill level, if no packet variation or frequency offset between sender and receiver exists. As explained above, if the APM does not compensate for the frequency difference between sender and receiver, the error factor would increase monotonically until the jitter buffer would either overflow or underflow. The APM goal is therefore to maintain the error factor bound, and preferably at a minimum.

In a step 206, each number of intervals $N_{samp}$ (typically 80), a maximum error factor E is calculated as the maximum of all interval error factors $E_i$ within these $N_{samp}$ intervals. All further operations are decimated to work at a lower rate, where the interval between subsequent operations is equal to $I \times N_{samp}$, effectively limiting the maximum number of PAs generated by the APM during each $I \times N_{samp}$ interval to be less than or equal to $N_{samp}$. Step 206 may use other functions to calculate E from interval error factors $E_i$, including averaging, as well as taking only the last $E_i$ value.

In a step 208, the maximum error factor E calculated in step 206 is multiplied by a gain factor G. A typical value of G is 1e-5. The gain multiplied E is added to an accumulator A. The initial value of the accumulator A is set to zero.

If A is greater than 1, a negative PA command $PA_i^-$ is generated in a step 210, and the accumulator value A is decremented by 1. If A is smaller than -1, a positive PA command $PA_i^+$ is generated in a step 212, and A is incremented by 1. Else, nothing is done. Steps 202 and 204 continue to operate each interval I, while steps 206 up to 212 continue to operate each $N_{samp}$ I intervals.

Figure 3:
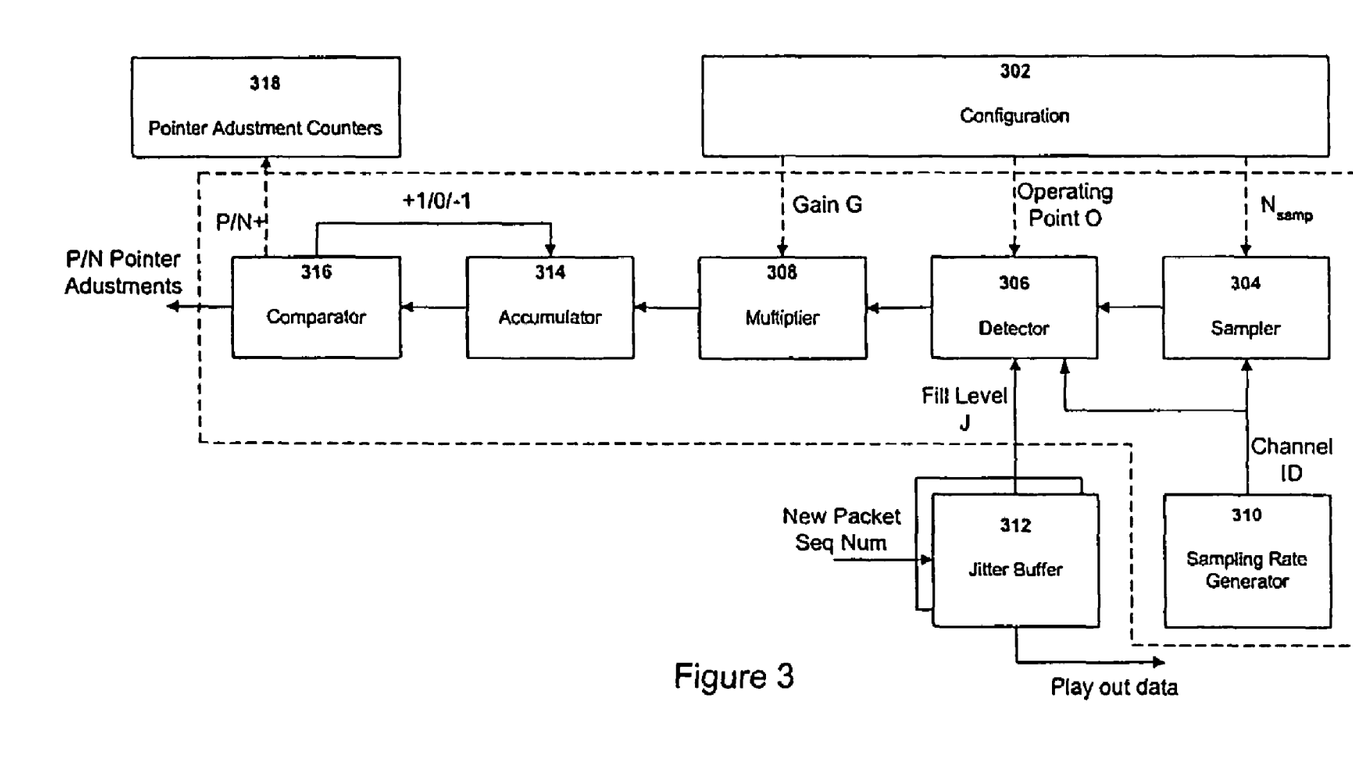
FIG. 3 describes a system that implements the APM method of FIG. 2 in hardware.

FIG. 3 describes a preferred embodiment of a system that implements the APM method of FIG. 2 in hardware, preferably using ASICs or a Field Programmable Gate Array (FPGA). The implementation supports adaptive pointer management for multiple channels, scaling to the number of virtual tributaries and STS channels emulated across the PSN and played out to the SONET link. The system consists of a configuration block or means 302 that provides, for each channel, three configuration parameters; an internal configuration parameter $N_{samp}$ to a sampler block 304, an operating point O to a detector block 306, and a gain factor G to a multiplier 308. A sampling rate generator 310 wakes up the APM pipe by waking up sampler block 304 every fixed interval I. The fixed interval I is proportional to the time interval between packets carrying circuit emulation data for this channel. Sampling rate generator 310 provides an indication on the channel on which the APM should work. Generator 310 ensures that the same APM mechanism can work on all channels, each in a fixed time interval, and ensures that the APM pipe can complete its work on one channel before starting to work on another channel. This allows efficient implementation in ASIC/FPGA. Sampler 304 maintains a counter per channel that is incremented each sampling rate generator trigger. When the counter approaches $N_{samp}$, as configured for the chosen channel, the sampler resets the counter and triggers detector block 306. The detector block receives triggers from the sampling generator and from sampler 304. Each sampling generator trigger, the detector takes a sample of a jitter buffer fill level $J_i$ from a jitter buffer 312, and calculates the error term $E_i$, which, as explained in FIG. 2, is the difference between the operating point $O_i$ of this channel and $J_i$. For calculating the maximum function, detector 308 then compares the measured error term $E_i$ to an error term E kept per channel. If $E_i$ is larger than E, the detector updates E to $E_i$. Note that E and $E_i$ may have either negative or positive values. Note that using the same design, detector 306 can ignore the sample rate generator trigger and use only the sampler trigger, effectively using only the one $E_i$ sample every $N_{samp}$ intervals. Sampler 304, detector 306, and sampling generator 310 are collectively referred to as sampling means.

Each sampler trigger, the detector passes error term E to multiplier 308, and resets E to its minimal value. Multiplier 308 multiplies error term E with the gain factor G of this channel, and passes the result to an accumulator 314. The multiplier can for example be implemented using a shifter, providing power 2 multiplication. The accumulator adds the result of multiplier 308 with the previously accumulated multiplier result for this channel, and passes the new value of the accumulator to a comparator 316. Comparator 316 compares the value received to 1 and −1, and determines whether positive or negative PA commands should be issued according to the method described in FIG. 2. If PA commands have been issued, the comparator indicates to the accumulator to change its accumulator value accordingly. Positive and negative PA counters 318 are maintained for each channel. This completes a full APM pipe triggered at a constant rate for each channel. Multiplier 308, accumulator 314 and comparator 316 are collectively referred to as pointer adjustment generating means.

Figure 4:
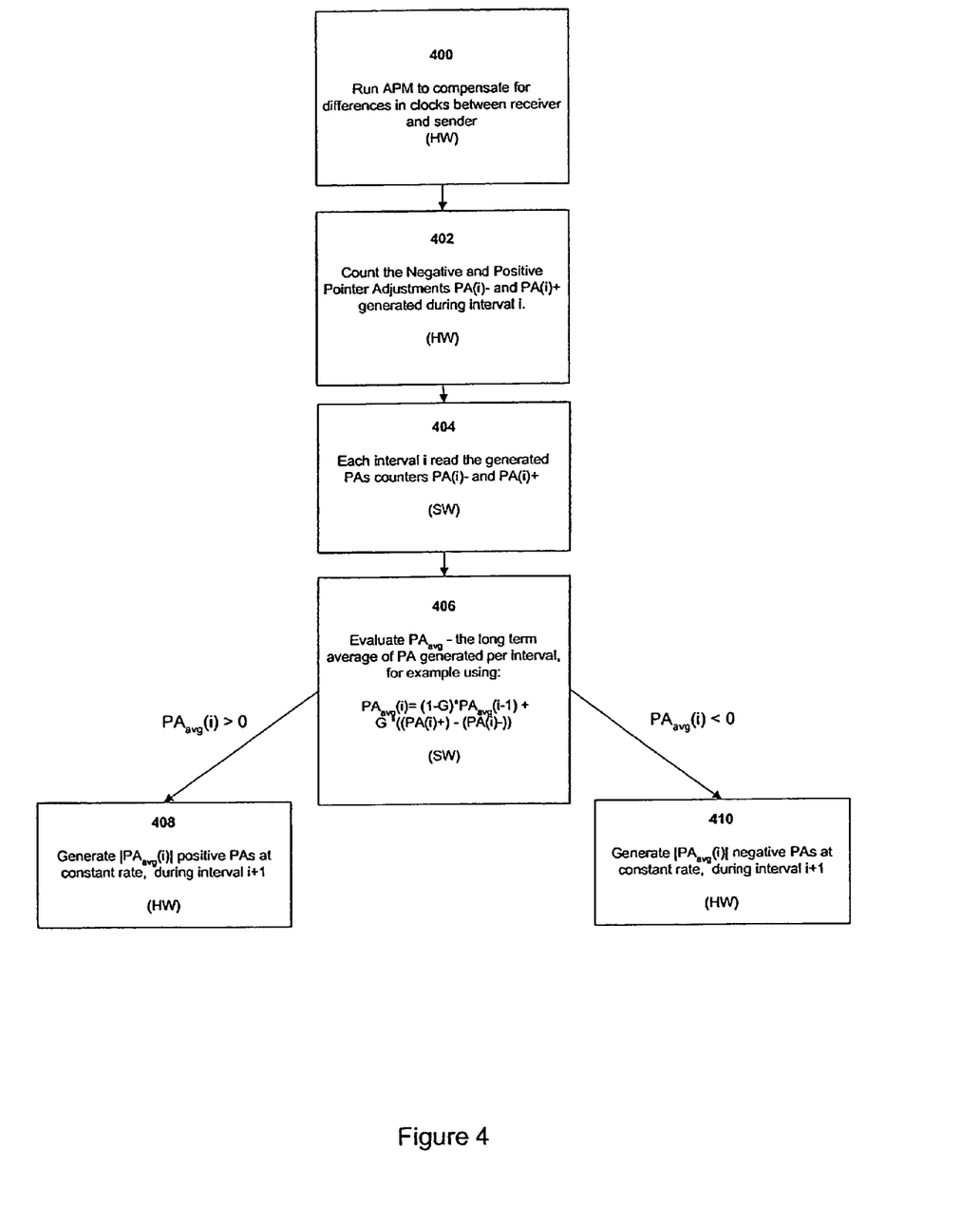
FIG. 4 describes in a block diagram the main steps of a preferred embodiment of a FL-APM method according to the present invention.

FIG. 4 describes in a block diagram the main steps of a preferred embodiment of a Frequency Locked APM (FL-APM) method for improving the distribution of PAs generated by APM according to the present invention. FIG. 4 also indicates which steps should be preferably implemented in hardware (HW) and which in software (SW), while FIG. 5 describes such an exemplary implementation. The Frequency Locked APM method can improve the APM mechanism described in FIGS. 2 and 3, as well as other known APM methods. The FL-APM enhances the operation of APM mechanism in the following ways:

1. Even distribution of PAs generated by APM, and avoidance of PA bursts. This helps in minimizing the wander (timing disturbance) of signals carried within the SONET/SDH containers.
2. Convergence to the operating point. An APM method as described in FIGS. 2 and 3 does not maintain a zero error factor, i.e. does not maintain the jitter buffer at its operating point, but rather at a fixed offset from it, depending on the frequency differences between sender and receiver.

Figure 5:
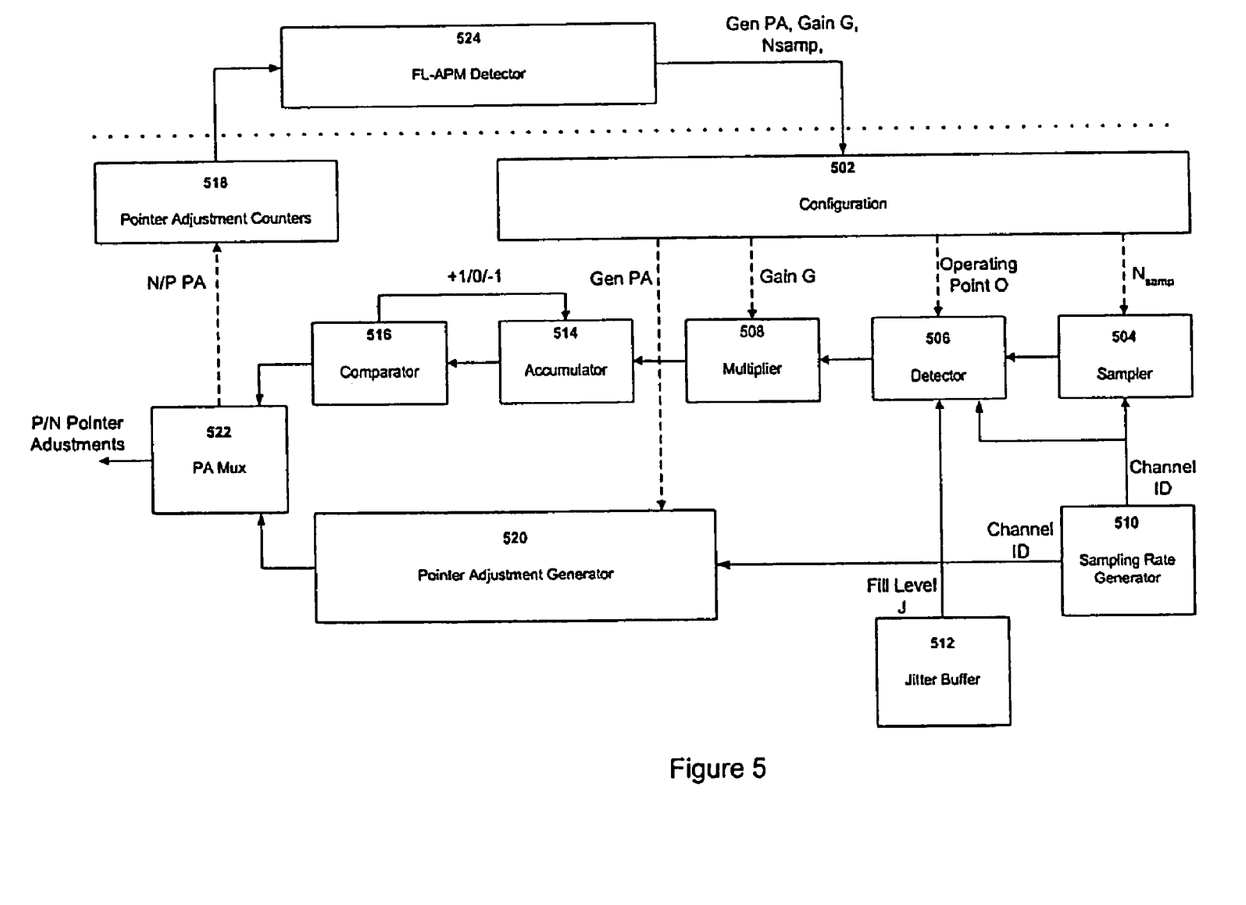
FIG. 5 describes a system that implements the FL-APM method of FIG. 4 in HW and SW.
Figure 6A:
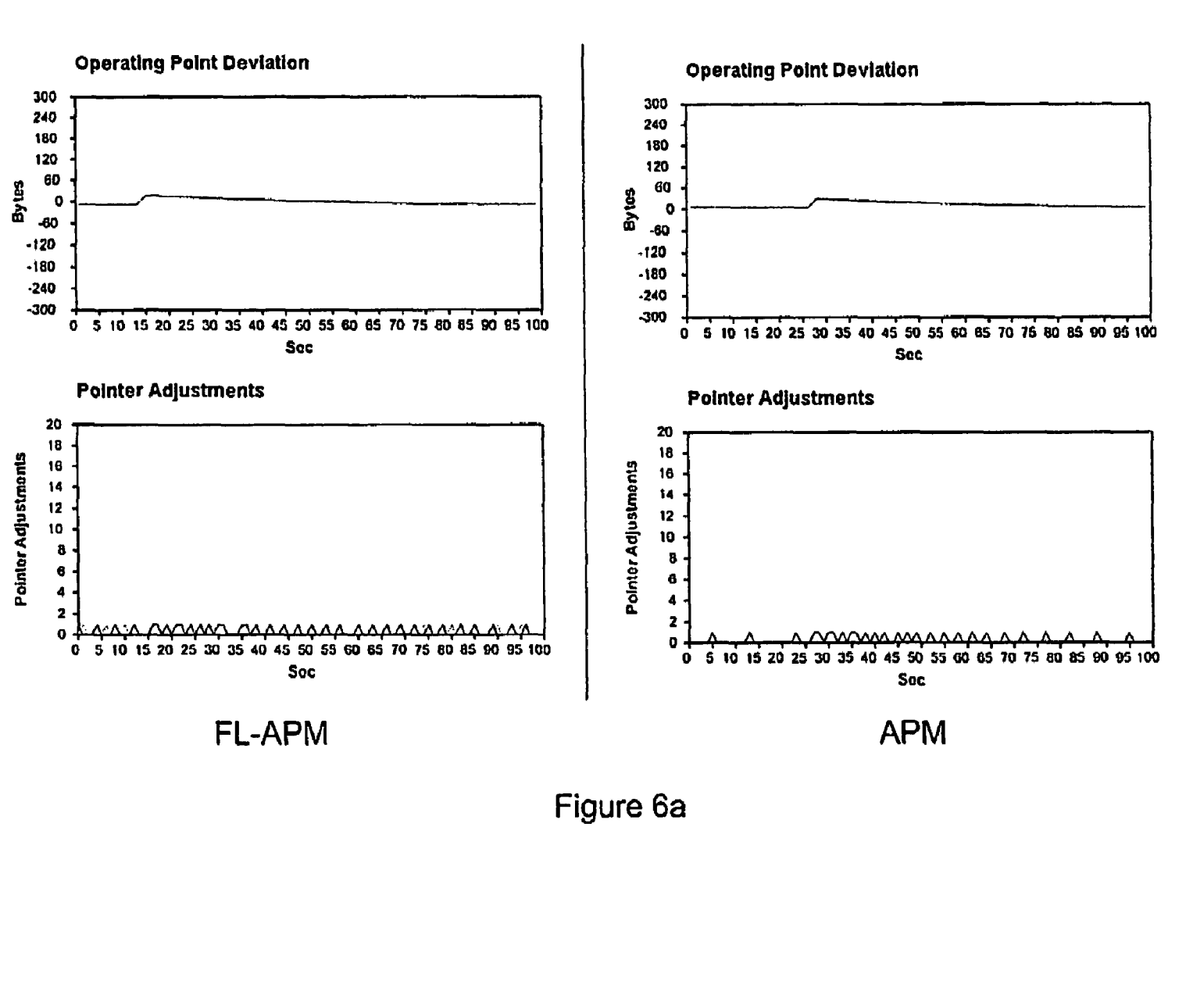
FIG. 6a describes in a graphical form the behavior of APM and FL-APM described in FIGS. 3 and 5 under the same conditions, demonstrating FL-APM improvements.
Figure 6B:
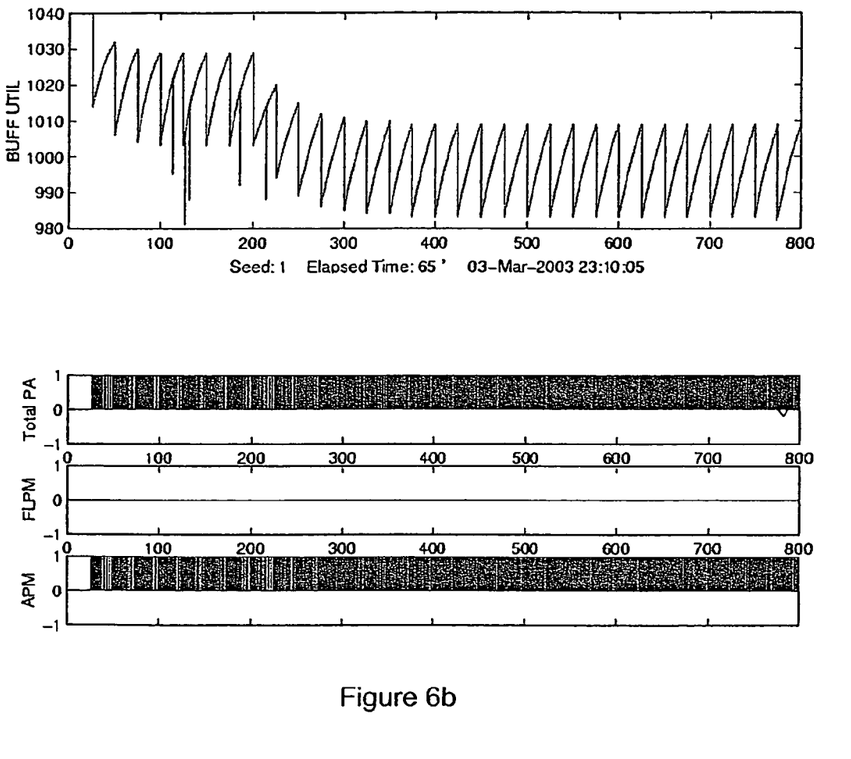
FIG. 6b describes in a graphical form the jitter buffer fill level and the generated PA for the APM system described in FIG. 3.
Figure 6C:
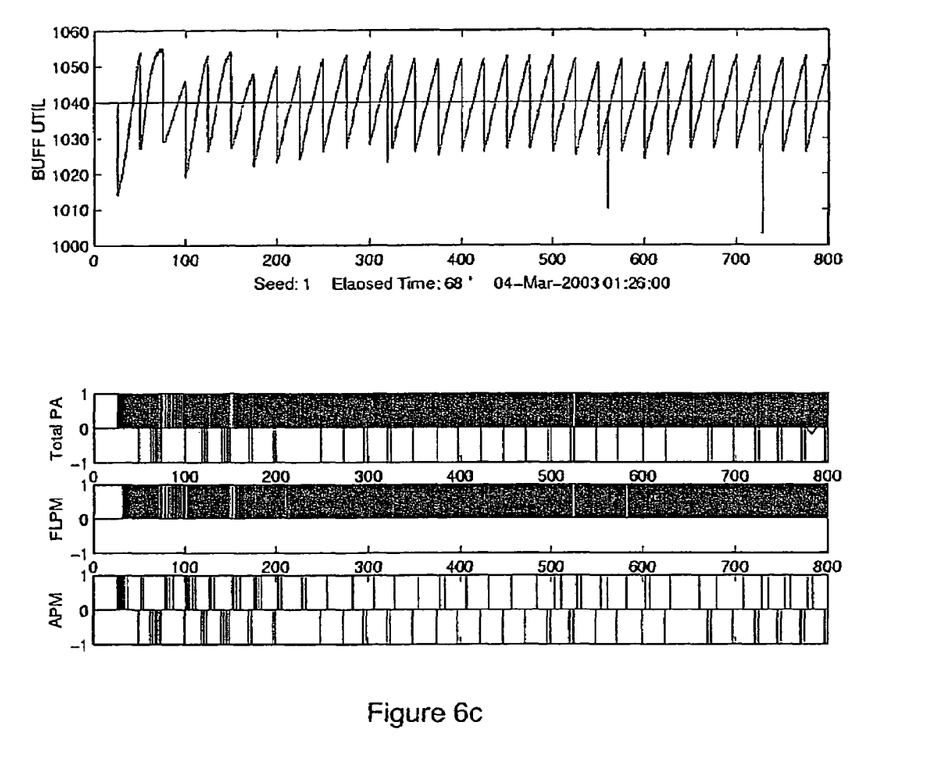
FIG. 6c describes in a graphical form the jitter buffer fill level and the generated PA for the FL-APM system described in FIG. 5.

FIG. 6a provides output graphs of APM and FL-APM mechanisms, as described in FIG. 3 and FIG. 5 respectively. The operating point deviation graphs show the error terms E as function of time. The difference between the sender clock frequency $f_s$, and the receiver clock frequency $f_r$ is 1 ppm (part per million), e.g. $(f_s-f_r)/f_s=1e-6$. The operating point deviation graphs have a jigsaw pattern due to the frequency offset between sender and receiver. The jigsaw pattern has a period of 100 seconds. The generated PAs in the FL-APM graph are evenly distributed over the entire 100 second range, while the generated PAs in the APM graph have a periodic pattern similar to the operating point deviation graph. Most of the APM-generated PAs are grouped around a difference jigsaw steep step 602. FIGS. 6b and 6c also show the different behaviors of APM and FL-APM. FIGS. 6b and 6c are described below following the FL-APM method and system descriptions.

In FIG. 4, the receiver runs the APM method to compensate for differences in clocks between receiver and sender, as described in FIGS. 2 and 3 (or by any other similar mechanism) in step 400. The APM mechanism counts the number of positive and negative PAs it generates in a step 402. Steps 400 and 402 are preferably implemented in hardware. In a step 404, the Frequency Locked APM reads the PA counters counted each interval I' (which is much larger than the APM interval). A typical value for I' is 1 second. In a step 406, a long-term average $PA_{avg}$ of the number of PAs generated per interval is taken. $PA_{avg}$ is proportional in sign and magnitude to the difference between sender and receiver frequencies. An example of such averaging function is given below:

$$PA_{avg}(i+1)=(1-G)*PA_{avg}(i)+G*(PA^+(i)-PA^-(i))$$

The number of negative PAs generated in interval i is decremented from the number of positive PAs generated at interval i, and the difference is multiplied by a Gain factor G (different from the APM gain factor), and added to the previous average value $PA_{avg}(i)$ multiplied by a (1−G) factor. To check this formula, if one takes G=1, and APM generates only negative pointer adjustments, $PA_{avg}$ would equal −(PA⁻) for each interval i. $PA_{avg}$ indicates the sign and number of PAs generated by APM each interval. The idea of Frequency Locked APM is to generate a $PA_{avg}$ number of PAs in each interval, the generated PAs evenly distributed along the interval, and by that provide the best compensation for the frequency difference between sender and receiver without creating timing impairments.

More complex averaging functions can be implemented in step 406. Step 406 is preferably implemented in software. If $PA_{avg}$ is positive, $PA_{avg}$ evenly distributed positive PAs are generated in the next interval in a step 408. If $PA_{avg}$ is negative, $PA_{avg}$ evenly distributed negative PAs are generated in the next interval in a step 410. Steps 408 and 410 are preferably implemented in HW. For example, if $PA_{avg}$=−20, and the interval I is 1 second, generating one negative PA each 50 milliseconds would result in an even distribution of PAs compensating for the frequency difference. This step is preferably implemented in hardware.

Optionally, in step 410, the mechanism changes the APM G and $N_{samp}$ parameters, to increase/decrease the APM sensitivity. All steps continuously operate at each interval I.

FIG. 5 describes a preferred embodiment of a system that implements the Frequency Locked APM method of FIG. 4 in HW and SW. Blocks 502-518 describe the APM operation, implemented as described respectively in blocks 302-318 of FIG. 3., and are referred to herein as "APM" means. The dotted line separates the SW and HW implementation blocks. The Frequency Locked APM includes a long term averaging function in an FL-APM detector block 524, which calculates the average number of PAs generated by the APM and FL-APM. To compute the average, the performance monitoring counters of a PA counters block 518 are sampled each interval, and the calculated average PA is fed to a PA generator 520 via a configuration block 502. A sampler rate generator 510 triggers APM blocks 504 to 512, as well as a PA generator 520. PA generator 520 is implemented by maintaining a counter per each channel. The counter is incremented each trigger. When the counter reaches a threshold Gen-PA configured by FL-APM block 524, it generates a PA command (positive or negative, depending on the sign of Gen-PA), and resets the counter. Gen-PA is calculated by block 524 such that the required number of PAs will be generated in an interval I. A multiplexer PA MUX 522 receives PA commands from APM via a comparator 516, as well as commands from PA generator 520, and ensures that only a single PA command is generated. In case of conflict, PA MUX 522 always prefers APM PA commands delivered through comparator 516. The PA counters are updated from PA MUX 522.

FIG. 6a shows that the operating point deviations of FL-APM are slightly higher than those of APM, indicating that the FL-APM maintains the average of operating point deviation to zero, regardless of the frequency offset. FIGS. 6b and 6c provide PA output graphs for APM and FL-APM. FIG. 6b includes a graph that describes the jitter buffer fill level (buffer utilization) measured for a period of 800 seconds. The jigsaw pattern is due to a 5 ppm difference between sender and receiver. The lower graphs in each figure show the generated PA, each positive PA marked as one 0 to 1 vertical line, while negative PA is marked as one −1 to 0 vertical line. The lower graph marked "APM" indicates the PA generated by the comparator 516 of FIG. 5. The graph marked "FLPM" shows the PAs generated by PA generator 520 of FIG. 5, as configured by FL-APM detector 524. The graph marked "Total PA" indicates the total PA generated by Mux 522 of FIG. 5. The PAs generated by APM in FIG. 6b demonstrate a periodic distribution. The period is similar to the jitter buffer fill level period caused by the 5 ppm difference between sender and receiver clocks. This periodic behavior may cause wander (low rate) timing impairments.

FIG. 6c shows the operation of FL-APM under the same conditions. The PAs generated in FIG. 6c are evenly distributed, and therefore do not generate wander timing impairments. In FIG. 6c APM-generated PAs indicate that comparator 516 (FIG. 5) still generates a small number of positive and negative PAs.

Figure 7:
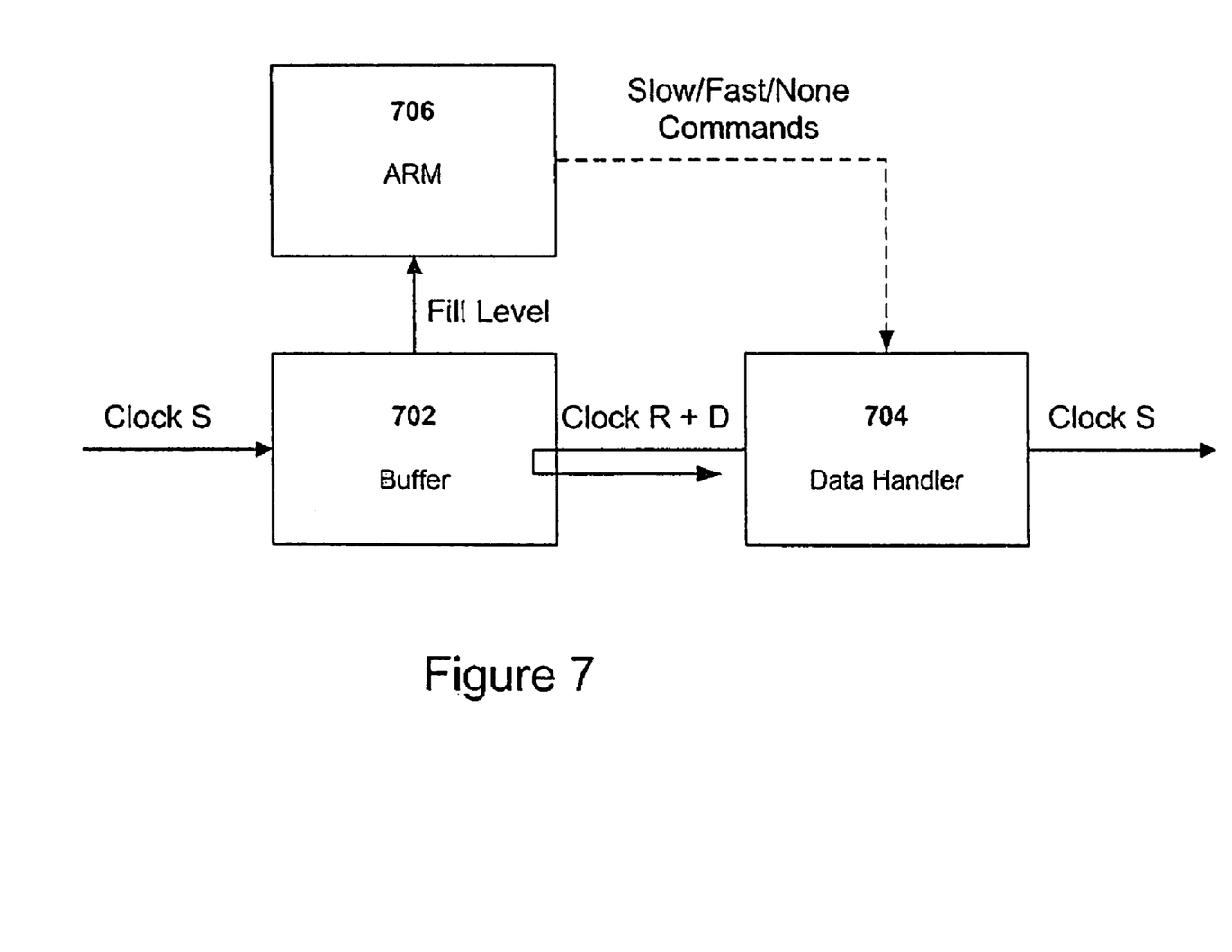
FIG. 7 describes a simplified system with ARM.

FIG. 7 describes a simplified system with Adaptive Rate Management (ARM) according to the present invention. Data clocked by a master clock S is inserted into an apparatus running with slave Clock R. Clock S and Clock R are not synchronized, and therefore may have difference average frequencies. In order to accommodate for differences between clocks without losing data, the incoming data is first inserted into a buffer 702. One example of a buffer 702 is jitter buffer 136 of FIG. 1. An ARM block 706 monitors the fill level of buffer 702, and provides 'Fast', 'Slow', or 'None' rate control commands to a data handler block 704. The data handler block extracts data from buffer 702 at a rate determined by Clock R when the control command received from the ARM block is 'None', at a rate higher than Clock R by a fixed ΔD if the control command is 'Fast', or at a rate lower than Clock R by a fixed ΔD if the control command is 'Slow'. Examples of an ARM system include the APM and FL-APM systems described in FIG. 3 and FIG. 5, where the 'Fast', 'Slow' and 'None' indicate generation of negative, positive, or no pointer adjustments. In the APM and FL-APM systems, the data handler provides an output to a SONET mapper or SONET framer as described in FIG. 1. Another example of an ARM system shown in FIG. 7 is a bit-stuffing controller, where the 'Fast', 'Slow' and 'None' commands translate respectively into 'use more opportunity bits than determined by Clock R', 'use less opportunity bits than determined by Clock R' and 'use the opportunity bits as determined by Clock R'. Data handler 704 in bit-stuffing controllers would map a lower rate PDH signal into a higher rate one (e.g. a T1 into T3) or to a SONET container (T1 bit-asynchronously mapped into SONET VT1.5 container).

Figure 8:
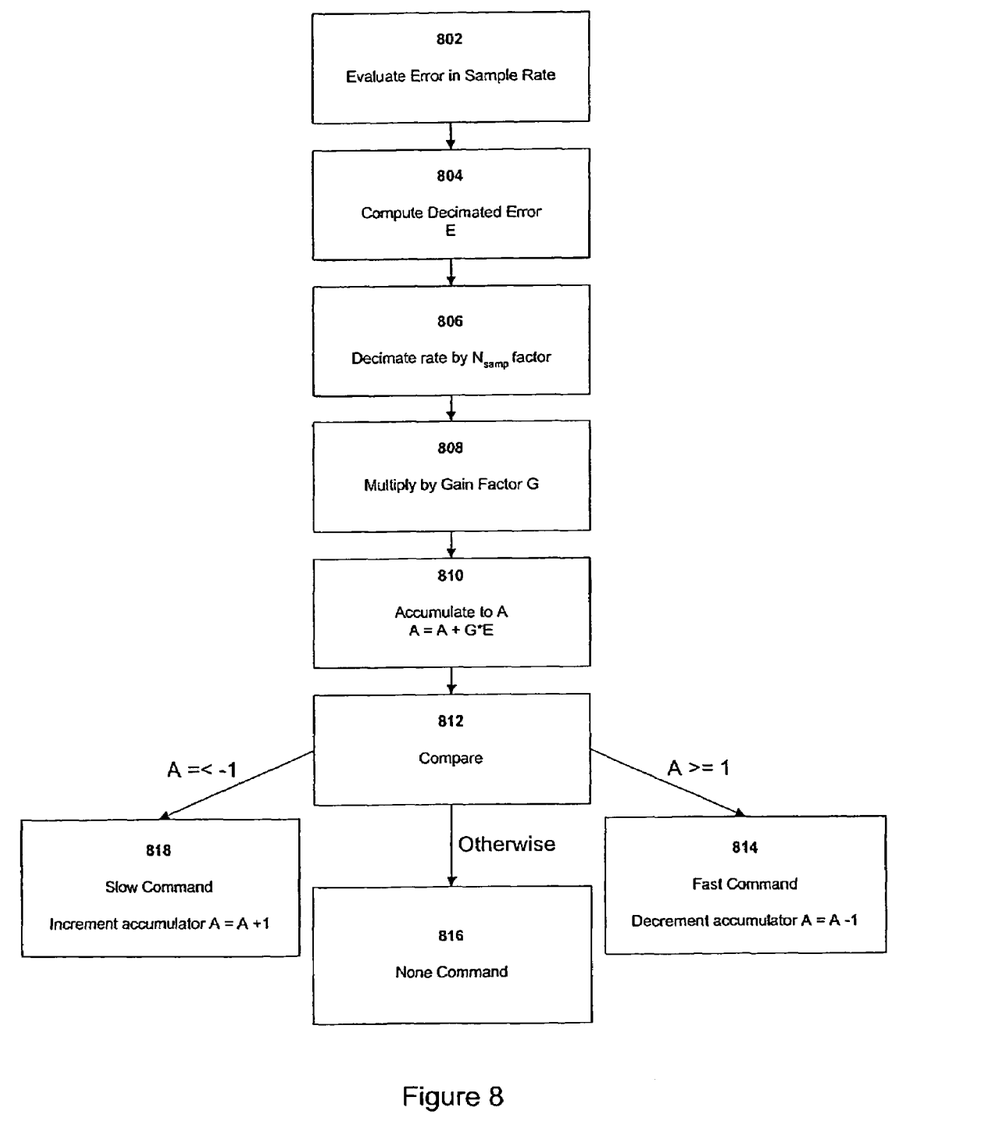
FIG. 8 describes in a block diagram the main steps of a preferred embodiment of an Adaptive Rate Management method according to the present invention.

FIG. 8 describes in a block diagram the main steps of a preferred embodiment of an ARM method according to the present invention. The APM method described in FIG. 2 is an application of the ARM method for the field SONET emulation. ARM can be applied to other applications, one example being bit-stuffing controllers. The ARM determines an error $E_s$ at sample rate in step 802. An example of a sample rate is the circuit emulation arrival rate of circuit emulation packets for the APM method of FIG. 2. The error $E_s$ is the difference between the fill level of buffer 702 of FIG. 7 and its optimal level. Optionally, in step 804, a decimated error E is calculated out of the last $N_{samp}$ error values $E_s$. An example of a function for calculating the decimated error E out of the $N_{samp}$ $E_s$ error values is $E=\max_s(E_s)$, i.e. taking the maximum $E_s$ sampled on the $N_{samp}$ intervals, as used in step 206 in FIG. 2 of the APM method. Alternatively, as with $E_i$ in FIG. 2, other functions may be used to calculate the decimated error E from error values $E_s$, including averaging, as well as taking only the last $E_s$ value. In step 806, the sample rate is decimated by $N_{samp}$, and steps 808-816 operate at the decimated rate. The decimation ensures that the rate commands in steps 812-816 are operated at a maximum rate equal to the sample rate divided by $N_{samp}$. In step 808, the decimated error E is multiplied by a gain G, and in step 810 the result is added to an accumulator A to obtain an updated accumulator value. In step 812, the updated value of A is compared against the values 1 and −1. If A is smaller than, or equal to −1, ARM issues a 'Slow' command and increments the value of A by 1. If A is larger than, or equal to 1, ARM issues a 'Fast' command and decrements the value of A by 1. Else, ARM issues a 'None' command. Steps 802 and 804 continue to operate at the sample rate, while steps 808-816 continue to operate at the decimated rate.

In summary, the present invention provides a method and system for Adaptive Rate Management that is superior in its flexibility and performance to existing APM methods and systems. In particular, a simplified ARM system may be used both as an APM system and as a bit-stuffing controller. The present invention also provides enhanced APM methods and systems, including a Frequency Locked APM method and system.

The APM method of the present invention has a number of clear advantages over prior art methods, in that:
- It stands within the required clock performance requirements
- It has a controlled maximal PA rate (controlled by $N_{samp}$).
- It generates a minimally erroneous PA.
- It is simple to implement in hardware and software.
- It can support multiple channels with a single, simple, and efficient design.
- The same set of parameters is suitable for multiple network conditions and frequency offsets of sender.
- It provides a stable mechanism that can adapt to changes in network conditions, and can adapt to changes of frequency offsets between receiver and sender.

In addition, the FL-APM method has additional advantages over prior art methods, in that:
- It distributes the pointer adjustments generated evenly, minimizing the wander and jitter timing impairments.
- It enables APM to converge to the configured operating point, removing the dependency on the frequency offset between sender and receiver.
- It can work with any APM implementation.

While the invention has been described with respect to a limited number of embodiments, it will be appreciated that many variations, modifications and other applications of the invention may be made.

What is claimed is:

1. An adaptive pointer management method for accommodating clock frequency differences between a sender having a sender clock and a receiver having a receiver clock, the method comprising the steps of:
   a. determining an error value $E_i$ at a sample rate;
   b. decimating said sample rate by a value $N_{samp}$;
   c. determining a decimated error value E as a function of a last $N_{samp}$ number of said error values $E_i$;
   d. at said decimated rate, obtaining an updated accumulator value based on said decimated error value E; and
   e. at said decimated rate, based on said updated accumulator value, generating an appropriate pointer adjustment command and changing said accumulator value; whereby said pointer adjustment command ensures synchronization between the transmitter and receiver rates.

2. The method of claim 1, wherein the receiver and sender are connected over a packet switched network.

3. The method of claim 1, wherein said step of determining an error value $E_i$ includes monitoring a jitter buffer fill level $J_i$ each i-th interval having a length I, said length determined by the receiver clock.

4. The method of claim 1, wherein said step of computing an error factor $E_i$ includes determining, each i-th interval, an operating point $O_i$, and subtracting said $O_i$ from said $J_i$.

5. The method of claim 1, wherein said step of determining a decimated error value E includes using a function selected from the group consisting of taking the maximum value of said last $N_{samp}$ number of said error values $E_i$, averaging said $E_i$, or taking the last value of said $E_i$.

6. The method of claim 1, wherein said step of obtaining an updated accumulator value includes multiplying said decimated error value E by a gain G to obtain an E*G product, and adding said E*G product to an immediately previous said accumulator value.

7. The method of claim 1, wherein said step of generating an appropriate pointer adjustment command further includes, if said accumulator value is smaller than or equal to −1, generating a positive pointer adjustment command and incrementing said accumulator value by +1; if said accumulator value is larger than or equal to +1, generating a negative pointer adjustment command and decrementing said accumulator value by −1; and if said accumulator value is greater than −1 and smaller than +1, do nothing.

8. An adaptive rate management method for adapting a receiver rate to a transmission rate, the method comprising:
   a. determining an error value $E_i$ at a sample rate;
   b. decimating said sample rate by a value $N_{samp}$;
   c. determining a decimated error value E as a function of the last $N_{samp}$ said error values $E_i$;
   d. at said decimated rate, obtaining an updated accumulator value based on said decimated error value E; and
   e. at said decimated rate, based on said updated accumulator value, generating an appropriate rate adjustment command and changing said accumulator value;
   whereby said rate adjustment command ensures synchronization between the transmitter and receiver rates.

9. The method of claim 8, wherein the error value $E_i$ is determined by monitoring a jitter buffer fill level $J_i$ each i-th interval having a length I, said length determined by the receiver clock;

10. The method of claim 8, wherein said step of computing an error factor $E_i$ includes determining, each i-th interval, an operating point $O_i$, and subtracting said $O_i$ from said $J_i$.

11. The method of claim 8, wherein said decimated error value is obtained using a function selected from the group consisting of taking the maximum value of said last $N_{samp}$ number of said error values $E_i$, averaging said $E_i$, or taking the last value of said $E_i$.

12. The method of claim 8, wherein said step of obtaining an updated accumulator value includes multiplying said decimated error value E by a gain G to obtain an E*G product, and adding said E*G product to a previous said accumulator value.

13. The method of claim 8, wherein said step of generating an appropriate rate adjustment command further includes, if said accumulator value is smaller than or equal to −1, generating a 'slow' rate command and incrementing said accumulator value by +1, if said accumulator value is larger than or equal to +1, generating a 'fast' rate command and decrementing said accumulator value by −1, and if said accumulator value is greater than −1 and smaller than +1, generating a 'none' rate command.

* * * * *